C. W. Saladee,
Riding-Saddle Stirrup.
No. 1,736. Reissued Aug. 9, 1864.
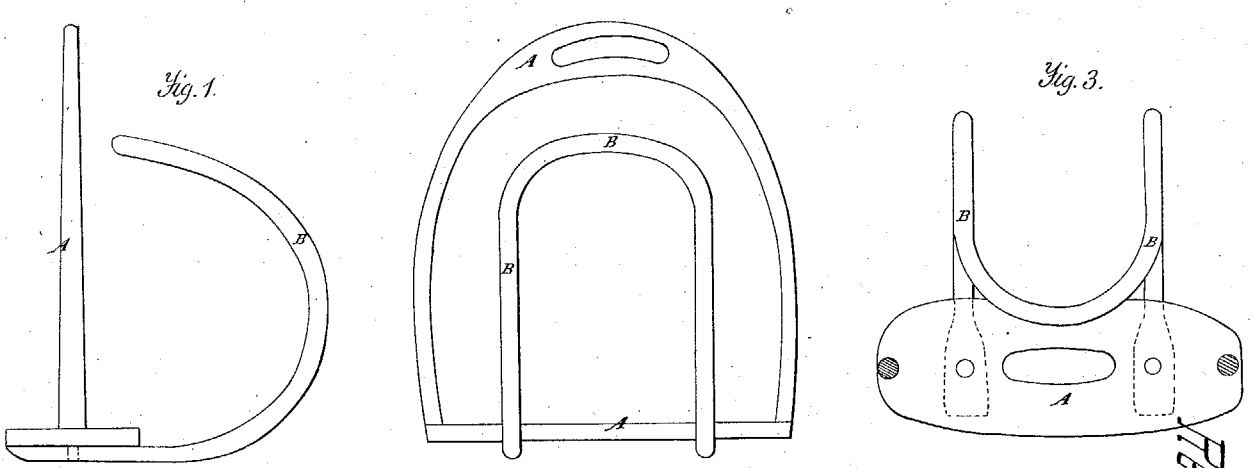
Witnesses.
Charles Alexander
W. C. Clayton
Inventor:
C. W. Saladee,
by Atty. J. C. Clayton
N. PETERS, PHOTO-LITHOGRAPHER, WASHINGTON, D. C.

UNITED STATES PATENT OFFICE.

CYRUS W. SALADEE, OF PADUCAH, KENTUCKY.

STIRRUP.

Specification forming part of Letters Patent No. 42,512, dated April 26, 1864; Reissue No. 1,736, dated August 9, 1864.

*To all whom it may concern:*

Be it known that I, CYRUS W. SALADEE, of Paducah, in the State of Kentucky, have invented certain new and useful Improvements in Stirrups for Riding-Saddles; and I do hereby declare that the following is a full and exact description thereof, reference being had to the accompanying drawings and the letters of reference thereon marked.

In the drawings, Figure 1 is a side elevation, Fig. 2 is a front elevation, and Fig. 3 is a plan view, of the foot-bar or bottom of the stirrup and manner of attaching the guard.

To enable others to make and use my said invention, I will give the following detailed description thereof.

This invention relates to a new article of manufacture; and it consists in providing the front of the stirrup with a perpendicular central ornamental metal guard to prevent the foot of the rider from passing too far through, and which guard is formed or stamped out of a rod or plate of metal and secured rigidly to the foot-bar of the stirrup between the two upright side bars of the latter in such manner as to give the guard a central upright position in the front of the stirrup for the toe of the boot to rest against. This guard is to be attached to any metallic stirrup of the usual form, as shown, and may also be as readily attached in like manner to wooden stirrups.

B is the guard, formed by looping a rod, as shown at Fig. 2, or may be stamped from a plate of metal, imparting to it the shape substantially as shown in Figs. 1 and 3. The lower extremity of this guard is secured to the bottom side of the foot-bar by means of screws or rivets, as shown in Fig. 3.

A guard, B, substantially the same as herein shown, may be stamped out of a sheet or plate of metal and an almost endless variety of style produced to render it more or less ornamental as the fancy of the manufacturer may dictate. This guard may also be cast malleable or cast in brass or other metal, separate and apart from the stirrup, and attached to any of the usual form of wood or metal stirrups by screws or rivets, as already described. The style of finishing this guard is also of great variety. For example, it may be either brass or silver plated, or may be simply japanned or painted in any appropriate ornamental design, or may be covered with thin leather of any desired color. As already indicated, this guard B is to be manufactured in various styles, and may be put on sale in pairs separate and apart from the stirrup, so that any person having now in use the ordinary wood or metal stirrup can purchase a pair of such style as he may fancy and have the same attached by any mechanic capable of making the necessary screws or rivets, or they may be attached by the manufacturer and the stirrup and guard combined put on sale.

This invention and claim relate and is confined to the construction and use, as a new article of manufacture, of a guard, molded, stamped, or cast, of metal to be attached at one end to the foot-bar of the stirrup, as described; and I disclaim any intention to hereby monopolize the use of a curved brace attached at both ends for the purpose of strengthening the stirrup or of supporting or bracing a leathern hood.

Having thus fully described my invention, what I claim as new, and desire to secure by Letters Patent as a new article of manufacture, is—

The guard B, constructed, operating, and attached in the manner substantially as shown and described.

CYRUS W. SALADEE.

Witnesses:
E. A. SALADEE,
JO. C. CLAYTON.